United States Patent [19]
Noffsinger

[11] 3,885,752
[45] May 27, 1975

[54] POCKET REEL

[76] Inventor: Gerald G. Noffsinger, Rt. 1, Box 147-N, Eatonville, Wash. 98328

[22] Filed: Mar. 4, 1974

[21] Appl. No.: 448,072

[52] U.S. Cl. ................................................ 242/96
[51] Int. Cl. .......................................... B65h 75/02
[58] Field of Search ............. 242/85.1, 84.8, 96, 61

[56] References Cited
UNITED STATES PATENTS

| | | |
|---|---|---|
| 58,378 | 10/1866 | Chamberlain ........................ 242/96 |
| 438,718 | 10/1890 | Truman ................................ 242/96 |
| 1,016,783 | 2/1912 | Schmucker ...................... 242/85.1 |
| 2,393,613 | 1/1946 | Combs ................................ 242/96 |
| 2,505,151 | 4/1950 | Schweitz ............................. 242/96 |
| 3,481,557 | 12/1969 | Miller ................................. 242/96 |

Primary Examiner—Edward J. McCarthy
Attorney, Agent, or Firm—Roy E. Mattern, Jr.

[57] ABSTRACT

A lightweight, compact reel for use with fishing line having a main body portion which is generally of a rectangular shape and of a thickness capable of insertion and transporting in a pants pocket. At opposite ends the sides extend leaving a central shorter portion or depressed end portions to confine the line. The pocket reel is wide enough to handle a fair length of line without excessive overlap and it is adapted to be rotated about an axis parallel to its ends using a pair of spaced removable like parallel handles, preferably of unequal length, which rotatably are passed through the main body portion of the pocket reel in a direction parallel to this axis of rotation. The longer of the two handles may be rotated in one larger circular direction permitting rapid winding of the line upon the pocket reel as the other handle is held still as the rotative axis of the pocket reel without interference occurring between the handles and/or the pocket reel.

2 Claims, 4 Drawing Figures

PATENTED MAY 27 1975  3,885,752

POCKET REEL

BACKGROUND OF THE INVENTION

The need for a lightweight pocket size portable reel usable for winding, unwinding and storing fishing line or other flexible filaments or fibers for immediate use has long been recognized. A reel of this type will be used by all fishermen and perhaps also by carpenters for their chalkline. Backpackers will carry the pocket pole for their fishing line and it may be carried entirely within their pack. Also people who spend a great deal of time traveling in an automobile may want to have a fishing line, on this pocket pole, at ready access when they see a likely fishing spot.

Previously the need for a compact reel has been recognized, for example, as set forth in U.S. Pat. No. 2,505,151 granted to Schweitz on Apr. 25, 1950. He provided a reel having a plurality of parallel rods held in a spaced configuration by a pair of end plates which served to keep the rods in their relative position and also to keep the filament wound upon the reel from inadvertently passing over the ends of the rods. One end of Mr. Schweitz's reel includes a central handle including a brake, whereas the other end includes a handle movable from a central position along the axis rotation of the reel to a position spaced from the axis providing a crank or lever for winding. This type of a reel is complex and expensive to manufacture.

Another approach to storing fishing line is illustrated in U.S. Pat. No. 2,684,550 granted on July 27, 1954 to Mr. Reid. He utilizes a simple, single handled reel secureed to one face of a disk and having a plurality of parallel rods projecting from this face of the single disk opposite to that side occupied by the handle. Whereas this construction permits the user to cast line from the reel by simply holding the handle and throwing the weighted line away from the reel, the structure necessitates a hand winding operation to recover the line.

Also the reeling line is taught by Mr. Heil in his U.S. Pat. No. 2,855,717 granted on Oct. 14, 1958. This structure disclosed, includes a spool having a handle outboard of the axis of rotation for winding, and a radially outwardly extending rod having loops to guide the line. Again, this is a more complex structure than herein proposed and further it is not as compact and portable.

Another previous reel type structure is shown in U.S. Pat. No. 3,484,979 granted to Mr. Wonsch on Dec. 23, 1969. His reel includes an integral handle and a spool with an outwardly projecting knob for winding. Again, Mr. Wonsch's structure is very complex and bulky.

More recently in U.S. Pat. No. 3,685,195 granted on Aug. 22, 1972 to Mr. Merryweather a spool is shown and described having a handle projecting out of the spool in a radial direction and having an extension passing back over the top of the spool serving as a guide for the line. The spool includes a handle for reeling. The combination of a spool and two handles results in a bulky structure.

Although several approaches have been made to the need for spooling line or wire in the past, as illustrated by the above disclosures in prior patents, none of the previous reels represent a simple, compact, lightweight reel which may be easily put in one's pants pocket, or a jacket pocket, or stored in a backpack, or left in the glove compartment of a car in a compact, ready to use embodiment.

SUMMARY OF THE INVENTION

A small compact pants pocket size lightweight reel for use primarily with fishing line is made of buoyant durable wood or plastic materials, to float if inadvertently dropped over water. It is approximately rectangular in shape and limited in thickness with sides extending on both ends to leave a central shorter central body defining with the extending ends confining structure to receive the winds of fishing line. In use the pocket size reel is rotated about an axis parallel to its ends by utilizing a pair of space removable nearly alike parallel rod handles. They are preferably of unequal length and rotatably passed through the pocket reel body in a direction parallel to the axis of rotation. During the adjustment of the quantity of line on the pocket reel, preferably the longer of the two rod handles is rotated in a circular direction while the other shorter rod handle is held still to serve as the rotative axis of the pocket reel. The storing and handling of other lines such as a carpenters chalkline or a kite flyers line is also readily undertaken using the pocket size reel.

DRAWINGS

The pocket size reel used principally for handling fishing line is illustrated in the drawings in both its plastic and wood embodiment.

DESCRIPTION OF PREFERRED EMBODIMENTS

Plastic Pocket Size Fishing Reel

Figure 1:
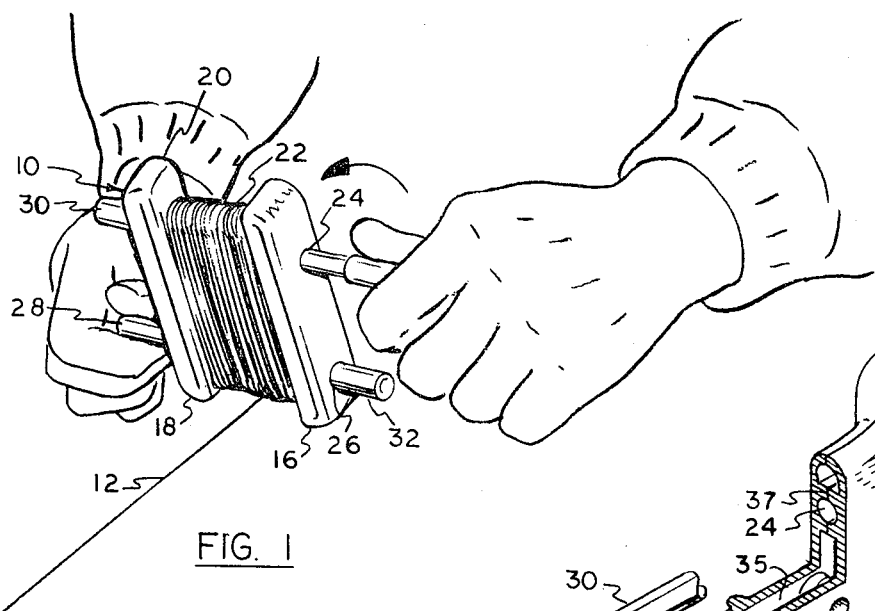
FIG. 1 is a perspective view of the plastic pocket size reel being held and operated by the hands of a user, the directional arrows indicating the rotation being undertaken to bring in the fishing line.
Figure 2:
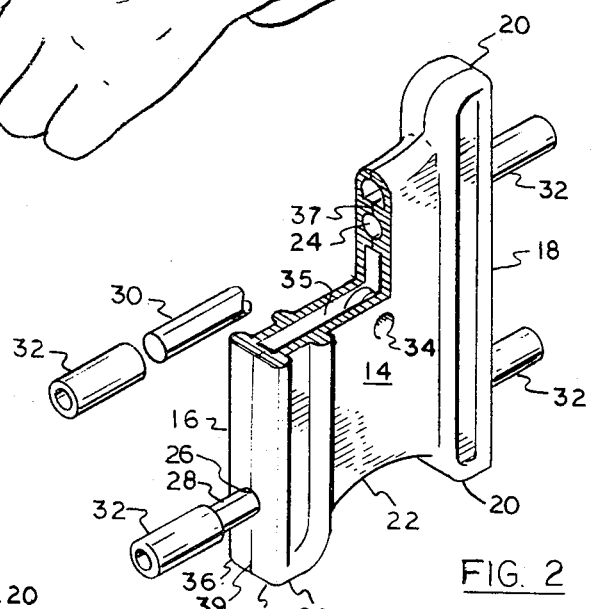
FIG. 2 is an enlarged, partially cut away and partially exploded perspective view indicating the plastic pocket size reel before a fishing line is secured to it.
Figure 3:
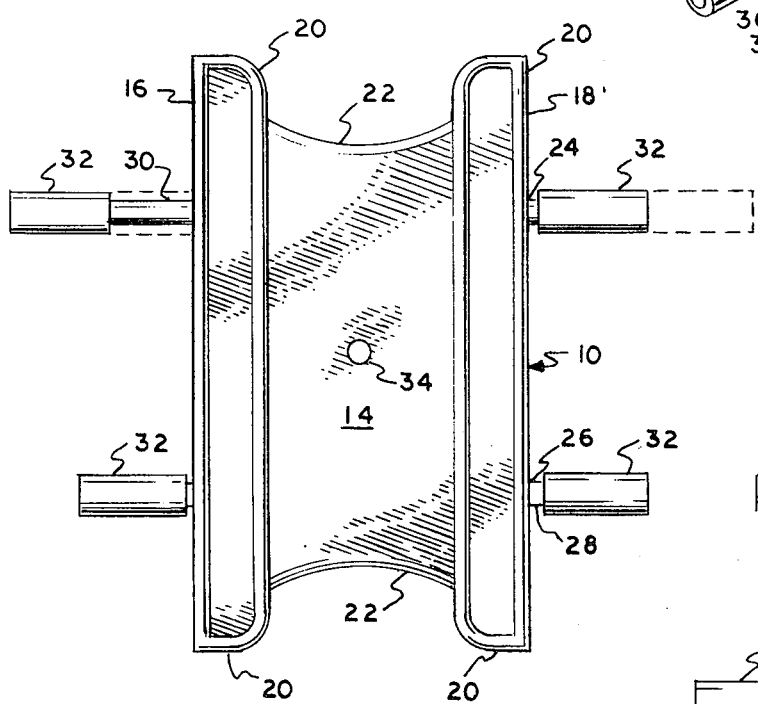
FIG. 3 is a plan view of the plastic pocket size reel to more clearly illustrate the fishing line guiding structure and also the relative size and positioning of the rotatable rod like handles.

In FIGS. 1, 2 and 3, the plastic embodiment of the pocket size fishing reel 10 is illustrated. Although it is used to control the length of line in use of a carpenters chalkline and other lines for other purposes, the pocket size fishing reel 10 is used principally to handle fishing line 12. Although these body portions are integral, they are described separately, as follows, to indicate their functions. A main body portion 14 receives the windings of the fishing line 12. To confine the fishing line 12 to this main body portion 14, two parallel longer side portions 16, 18, are arranged on respective sides of the body portion 14. Each of their ends 20 project beyond to define a captive volume 22 to control the fishing line being wound on the body portion 14.

To hold and to rotate the pocket size fishing reel 10, passageways or holes 24 and 26 are provided, as shown in FIG. 2, somewhat near each end of the reel 10, being formed throughout the body portion 14 and longer side portions 16 and 18. Each passageway removably and rotatably receives a bar, rod, or pin like handle 28 and 30. Preferably, handle 28 is shorter and handle 30 is longer. During fishing line 12 active length changes, handle 30 is gripped by the fingers of one hand of the fisherman and rotated through a sizable circle, while handle 28 is gripped by the fingers of the other hand of the fisherman and held, by comparison, somewhat stationary at the axis of revolution of the entire reel 10 as indicated by the directional arrows in FIG. 1.

To serve both as finger gripping members 32 and as removable stops 32 to keep the rod handles 28 and 30 in relative position on the pocket size reel 10, tightly fitted sleeves 32 cover each end length of each handle 28 and 30. During preliminary handling and shipping, these handles and sleeves may remain uninstalled to reduce the overall size of any required packaging.

Preferably at the center of the main body portion a small securement hole 34 is provided to aid in securing the end of the fishing line 12. Other line securement accessories, not shown, may be used in conjunction with securement hole 34 to confine the end of the fishing line 34, or other line such as a carpenters chalkline.

In this plastic embodiment 10 of the pocket size fishing reel, it is made from two alike molded halves 36, 38 joined together, along the joining line 39, using plastic cement. As indicated by the removal of portions in FIG. 2, the interior 35, as a result of the molded shape, is partially hollow, and also the passageway structures 37 are provided, forming passageways 24, 26 to receive the handles 28, 30. As shown in FIG. 3, handle 28 is shorter and handle 30 is longere. During fishing line 12 active length adjustments, handle 30 is moved about a circle clearing shorter handle 28, which preferably stays reasonably in place, serving as the rotative axis of th entire pocket size reel 10. Preferably the handles 28 and 30 and the grips or stops 32, are also made of plastic, making the pocket size fishing unit useful around salt water, as corrosion is avoided.

Wood Pocket Size Fishing Reel

Figure 4:
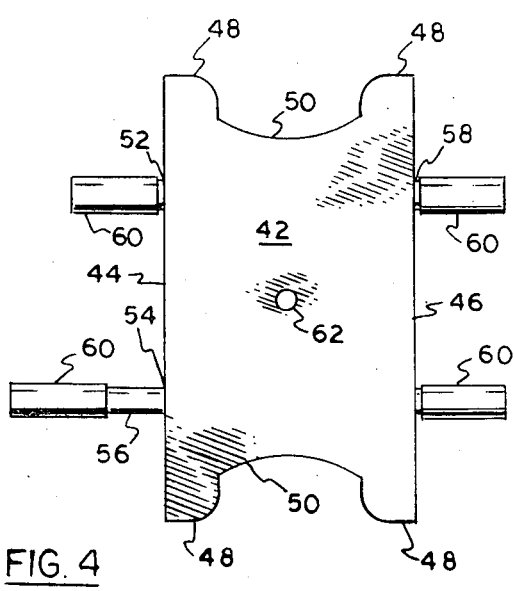
FIG. 4 is a plan view of the wood pocket size reel to also illustrate the fishing line receiving and guiding portions and the rotatable rod like handles.

In FIG. 4, the wood embodiment 40 of the pocket size fishing reel is illustrated. It is often made of marine or exterior plywood and formed, by cutting, to have the resulting integral main body portion 42, longer sides 44, 46, with their ends 48, defining the line receiving captive volume 50. Holes are drilled through to form the passageways 52, 54 to receive small diameter, often wood rods, a longer one 56 and a shorter one 58. Tightly fitted plastic sleeves 60 serving as gripping surfaces and stops are placed over the ends of the rod handles 56, 58 completing the assembly of the reel 40. Also a centrally located hole 62 is utilized in securing the fishing line 12. The operation of this wood embodiment 40 is undertaken in the same manner as the operation of the plastic embodiment 10 of this pocket size fishing reel, which also serves other line handling requirements.

I claim:

1. A lightweight compact pocket size reel to receive, for example, fishing line, comprising:
   a. a central elongated rectangular body;
   b. two elongated rectangular side portions adjacent to the central elongated body, of greater length than the central elongated body, and extending beyond the central elongated body to define a line receiving volume;
   c. passageway structures extending straight through the central elongated body and on through the elongated side portions at two locations equally spaced from the center of the central elongated body;
   d. rotatable handles, having a constant diameter that is less than the diameter of the passageway structures, one rotatable handle being longer than the other, and both rotatable handles extending completely through the passageway structures to be used by the fisherman in creating relative circular movement of the central elongated body to take in or let out active lengths of fishing line;
   e. sleeves, tightly fitted to the ends of the rotatable handles, to serve as finger grips and as stops to keep the rotatable handles in part confined in the passageways of the elongated central body and elongated side portions.

2. A lightweight compact pocket size reel, as claimed in claim 1, wherein the elongated body portion and the elongated side portions are formed by joining two similar plastic molded combined half sections of both the elongated body portion and elongated side portions which together create the passageway structures and interior void spaces.

* * * * *